(12) United States Patent
Thota et al.

(10) Patent No.: US 9,034,782 B2
(45) Date of Patent: May 19, 2015

(54) CATALYST COMPOSITIONS FOR CONVERSION OF VEGETABLE OILS TO HYDROCARBON PRODUCTS IN THE DIESEL BOILING RANGE AND PROCESS OF PREPARATION THEREOF

(71) Applicant: BHARAT PETROLEUM CORPORATION LIMITED, Mumbai, Maharashtra (IN)

(72) Inventors: Chiranjeevi Thota, Uttar Pradesh (IN); Pragya Rai, Uttar Pradesh (IN); N. Jose, Uttar Pradesh (IN); Dattatraya Tammannashastri Gokak, Uttar Pradesh (IN); Poyyamani Swaminathan Viswanathan, Uttar Pradesh (IN)

(73) Assignee: Bharat Petroleum Corporation Limited, Mumbai (IN)

( * ) Notice: Subject to any disclaimer, the term of this patent is extended or adjusted under 35 U.S.C. 154(b) by 29 days.

(21) Appl. No.: 13/665,407

(22) Filed: Oct. 31, 2012

(65) Prior Publication Data
US 2013/0116488 A1 May 9, 2013

(51) Int. Cl.
*B01J 21/02* (2006.01)
*B01J 21/04* (2006.01)
(Continued)

(52) U.S. Cl.
CPC ............... *B01J 27/188* (2013.01); *C10G 3/50* (2013.01); *C10L 1/04* (2013.01); *B01J 23/888* (2013.01); *B01J 27/19* (2013.01); *B01J 23/882* (2013.01); *B01J 23/883* (2013.01); *B01J 23/468* (2013.01); *B01J 23/44* (2013.01); *B01J 23/42* (2013.01); *B01J 23/36* (2013.01); *C10G 3/46* (2013.01); *C10G 3/47* (2013.01); *B01J 37/20* (2013.01); *B01J 21/04* (2013.01); *B01J 35/0026* (2013.01); *B01J 35/023* (2013.01);
*B01J 35/1019* (2013.01); *B01J 35/1042* (2013.01); *B01J 35/1061* (2013.01); *B01J 35/1085* (2013.01);
(Continued)

(58) Field of Classification Search
USPC ......... 502/113, 117, 313–315, 321–323, 327, 502/353–355; 585/166, 733
IPC ............ B01J 37/00,37/0201, 37/0207, 37/024, B01J 37/08, 37/12, 37/20, 32/00, 23/28, 23/30, B01J 23/40, 23/42, 23/44, 23/46, 23/462, B01J 23/468, 23/6525, 23/6527, 23/75, 23/755, B01J 23/882, 23/883, 23/888, 23/8913, 23/892, B01J 21/02, 21/04
See application file for complete search history.

(56) References Cited

U.S. PATENT DOCUMENTS 4,941,964 A * 7/1990 Dai et al. ................ 208/216 PP
6,037,300 A * 3/2000 Kasztelan et al. ............ 502/204
(Continued)

FOREIGN PATENT DOCUMENTS

EP 1880760 A1 * 1/2008

*Primary Examiner* — Patricia L Hailey
(74) *Attorney, Agent, or Firm* — Ladas & Parry LLP

(57) ABSTRACT

The present invention relates to a catalyst composition for conversion of vegetable oils to hydrocarbon products in the diesel boiling range, comprising a porous support; Group III A or VA element in the range of 1-10 wt %; Group VI B elements in the range of 1 to 20 wt %; Group VIII B elements in range of 0.01 to 10 wt %. The present invention further provides the process for preparing the catalyst composition for conversion of vegetable oils to hydrocarbon products in the diesel boiling range. The present invention also provides the process for conversion of vegetable oils to hydrocarbon products in the diesel boiling range using the catalyst composition or discarded refinery spent hydro-treating catalyst.

15 Claims, 1 Drawing Sheet

(51) Int. Cl.

| | |
|---|---|
| *B01J 23/28* | (2006.01) |
| *B01J 23/30* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/75* | (2006.01) |
| *B01J 32/00* | (2006.01) |
| *B01J 37/00* | (2006.01) |
| *B01J 37/08* | (2006.01) |
| *B01J 37/12* | (2006.01) |
| *B01J 37/20* | (2006.01) |
| *B01J 27/188* | (2006.01) |
| *C10G 3/00* | (2006.01) |
| *C10L 1/04* | (2006.01) |
| *B01J 23/888* | (2006.01) |
| *B01J 27/19* | (2006.01) |
| *B01J 23/882* | (2006.01) |
| *B01J 23/883* | (2006.01) |
| *B01J 23/36* | (2006.01) |
| *B01J 35/00* | (2006.01) |
| *B01J 35/10* | (2006.01) |
| *B01J 37/02* | (2006.01) |
| *B01J 35/02* | (2006.01) |

(52) U.S. Cl.
CPC .......... *B01J 37/0009* (2013.01); *B01J 37/0201* (2013.01); *C10G 2300/1014* (2013.01); *C10G 2400/04* (2013.01)

(56) References Cited

U.S. PATENT DOCUMENTS 6,207,870 B1 * 3/2001 Kasztelan et al. ............ 585/269
8,084,655 B2 * 12/2011 Dindi et al. .................... 585/240
8,546,626 B2 * 10/2013 Daudin et al. ................ 585/240

* cited by examiner

CATALYST COMPOSITIONS FOR CONVERSION OF VEGETABLE OILS TO HYDROCARBON PRODUCTS IN THE DIESEL BOILING RANGE AND PROCESS OF PREPARATION THEREOF

FIELD OF INVENTION

The present invention provides catalyst compositions for conversion of vegetable oils to hydrocarbon products in the diesel boiling range. The present invention further provides the process for making such catalyst compositions. The invention also provides the process for hydro-conversion of vegetables oils to hydrocarbon or diesel compounds. The catalytic compositions of the present invention comprises group III, V elements; mono or bimetallic groups VI and VIII elements supported on inorganic porous support.

BACKGROUND OF INVENTION

Use of renewable feed stocks for production of transportation fuels as a substitute to depleting fossil fuel is increasing [D. L. Klass, Academic Press, 1998, San Diego; L. R. Lynd, J. H. Cushman, R. J. Nichols, and C. E. Wyman, Science., 251 (1991) 1318-1323; C. E. Wyman, Appl. Biochem. Biotechnol., 45-46 (1994) 897-915]. European Union targets 2050 to use maximum biofuel in transportation fuel. Asian countries have also set a target of 20% blending of bio-fuels by 2020. Biofuels account for 9% of global transport fuels by 2030 with their production expected to increase three and half times from 1.8 millionbarrels/day (mbpd) in 2010 to 6.7 mbpd by 2030. Vegetable oils are renewable resources currently being used for production of biofuels from sustainable biomass feed stocks. There are many benefits of biofuels apart from use as domestic fuels like decrease in greenhouse gas emissions, dependence on fossil fuels, enhancing rural economy and increased national security [G. W. Huber, S. Iborra, A. Corma, Chem. Rev. 106 (2006) 4044; D. L. Klass, Biomass for Renewable Energy, Fuels and Chemicals, Academic Press, San Diego, 1998: L. R. Lynd, J. H. Cushman, R. J. Nichols, C. E. Wyman, Science 251 (1991) 1318]. Biodiesel production from trans-esterification of vegetable oils is currently the primary route for production of biofuels from vegetable oils. This process has many benefits; however, new biodiesel plants must be built requiring a capital investment. The economics of biodiesel production depends on selling the by-product glycerol, and increasing biodiesel production will cause the price for glycerol to decrease. Other alternatives for biofuels production are hydro processing of vegetable oils. One advantage for this process is to use existing petroleum refineries configuration for the process. There is no problem of glycerol production and its disposal.

In refining industry hydro-treating is used to remove S, N and metals from petroleum-derived feed stocks including heavy gas-oil or vacuum gas-oil. Vegetable oil hydro-treating produces straight chain alkanes ranging from n-$C_{15}$-n-$C_{18}$ which have a high cetane number ranging from 75-98, whereas typical diesel fuel has a cetane number around 45. The normal alkanes produced also have better cold flow properties. Commercial road trial of six postal delivery vans for a period of ten months showed that engine fuel economy was greatly improved by 20% blend of hydro-treated tall oil with diesel [M. Stumborg, A. Wong, E. Hogan, Bioresour. Technol. 56 (1996) 13]. The advantages of hydro-treated vegetable oil over trans-esterification resulted in switch over from fossil fuel to vegetable oil without any hardware modification in refinery and motor engine in transportation sector [M. Stumborg, A. Wong, E. Hogan, Bioresour. Technol. 56 (1996) 13]. Neste Oil Corporation is currently adding 3500 barrels per day unit to their Porvoo Kilpilahti, Finland oil-refinery that produces diesel fuel from vegetable oil by a modified hydro-treating process [Neste Oil, Neste Oil (2006), http://www.nesteoil.com/ (access year 2007)]. To process vegetable oil in existing petroleum refinery using existing infrastructure the vegetable oils need to be co-processed with petroleum-derived feed stocks such as heavy vacuum oil (HVO).

U.S. Pat. No. 4,992,605 describes vegetable oils conversion to diesel by using sulfided Ni—Mo and Co—Mo catalysts in presence of high hydrogen pressures (5-15 MPa) and temperatures in the range of 350 to 450° C. The vegetable oils such as soya, palm and sun flower were used as bio-feed. At low temperatures the yield does not meet the specifications. U.S. Pat. No. 5,233,109 describes thermal and catalytic cracking of vegetable oils leading to a wide range of products such as paraffins, aromatics and unsaturated hydrocarbons in the boiling range of gasoline and gas oils. The method described produces derivatives that cannot be directly used as gas oil fuel bases because the derivatives do not meet specifications like oxidation stability. Different catalysts used for the conversion are Akzo Ketjen Vison-47, Zeolite X, silica gel and Fluka alumina. Present invention describes hydro-treating of vegetable oils which differ from pure cracking.

U.S. Pat. No. 7,781,629 teaches a hydro-treating method where two catalyst beds are used by dedicating first one for only hydrodesulphurization whereas the second one is used for treating some part of the conventional gas oil and vegetable oils together. The effluents obtained at the out let of the second catalyst bed can be mixed with the predominant stream from the first bed. By following this method the process economy and specifications of the products were greatly met. Co—Mo and Ni—Mo catalysts have been used in the process but concentrations of metals have not been provided. This patent mainly focuses on process.

U.S. Pat. Nos. 4,992,605 and 5,705,722 describe methods of producing bio diesel from direct conversion of vegetable oils (rape, palm, soybean, and sunflower) or of lignocellulosic biomass to saturated hydrocarbons after hydro-treatment or hydro-refining of these products. The conversion methods described are operated at temperatures ranging from 350° C. and 450° C. to yield products with a high cetane number. In the proposed invention reactions were carried out at moderate hydrogen pressures and relatively low hydrogen consumption. The high cetane additives thus obtained are mixed with gas oil in proportions of 5 to 30% by volume. These two patents have the major drawback of high hydrogen consumption essentially due to the unsaturations present in the feeds consisting of vegetable oils and to the fact that the oxygen contained in the triglycerides is generally decomposed by hydro-deoxygenation in the presence of a hydro-treating catalyst. In the U.S. Pat. No. 5,705,722, a commercial nickel-molybdenum or alumina catalyst available under the trade mark CRITERION 424, was supplied in the form of extrudates (used for vegetable oil conversion).

U.S. Pat. No. 0,260,102 A1 describes a process wherein vegetable oils are converted to paraffins, wherein vegetable oils are hydro-treated as such or in combination with mineral hydrocarbon oil. This patent also concentrates in producing the n-paraffins which are raw materials for the production of detergents (LAB) which is beneficial for using in situations where kerosene is limiting factor for producing n-paraffins.

U.S. Pat. No. 2,163,563 teaches a method for conversion of vegetable oils and mineral oil mixtures in presence of hydrogen at high pressures (5-50 Mpa) using reduced nickel catalysts supported on alumina.

U.S. Pat. No. 4,300,009 teaches a catalytic conversion method wherein vegetable oils are converted to gasoline range molecules by using large pore zeolites preferably more than 5 Å.

Efficient utilization of biomass for the production of transportation fuels such as biodiesel is becoming increasingly important. In future, bio fuels may replace the gasoline and diesel requirements across the world. Present use of biofuels as blend can slow down the consumption of petroleum products while preserving the oil reserves.

Biodiesel is an alternate transportation fuel mainly produced by trans-esterification of vegetable oils. In trans-esterification process, large amount of water or methanol is used and large quantities of by-product glycerol are produced. In addition, the oxidation stability of the biodiesel is poor; and the engine may need some modifications or special maintenance when methyl esters are used. Moreover new plants are required to be built. The refinery hydro processing technology which is used for diesel or Vacuum Gas Oil (VGO) hydro-treating is one answer to address the above discussed drawbacks of trans-esterification process. The basic idea is to mix the VGO stream with vegetable oil and by effect of a high pressure, high temperature and a bi-functional catalyst; the triglycerides in the oil are transformed into hydrocarbons in the diesel range.

Not withstanding the amount of material available in the literature, there is a continuous need in this field of technology to provide an improved catalyst and process for conversion of vegetable oils to diesel at high temperatures and high hydrogen pressures. The catalyst should be more efficient in full conversion of vegetable oils. The catalyst should be able to retain the catalyst activity for longer durations and the products should meet al requisite specifications to use as transportation fuels.

Present invention concentrates on development of new catalyst formulations for vegetable oil conversion to diesel. The present invention concentrates in generation of diesel range molecules rather than gasoline range molecules. The catalyst composition of the present invention differs in constitution, product properties, efficiency and reaction conditions from the catalyst compositions of the prior art.

OBJECTS OF THE INVENTION

The primary object of the invention is to provide a catalyst composition which can efficiently convert vegetable oils to diesel.

Another object of the invention is to provide a catalyst composition which can convert vegetable oils to diesel at high temperatures and high hydrogen pressures.

Yet another object of the present invention is to provide a catalyst composition which can retain catalytic activity for longer durations.

Still another object of the invention is to provide a method for conversion of vegetable oils to diesel range hydrocarbons either in pure form or in addition with mineral oils using the above said catalyst composition in variable proportions.

A further object of the invention is to provide a product having high cetane number, better fuel properties in the range of diesel and can be easily blended with diesel pool in various proportions.

SUMMARY OF INVENTION

The present invention provides a catalyst composition for conversion of vegetable oils to hydrocarbon products in the diesel boiling range comprising: (i) a porous support; (ii) Group III A or VA elements; (iii) Group VI B elements in the range of about 1 to 20 wt %; and (iv) Group VIII B elements in range of about 0.01 to 10 wt %. In another embodiment the present invention provides that the porous support comprises of aluminium oxide.

In yet another embodiment the present invention provides that the porous support has unimodel pore size distribution in the range of about 20 to 250 Å; surface area in the range of about 200-250 m$^2$/g; bulk density in the range of about 0.80 to 0.85 g/cc; and pore volume in the range of about 0.5 to 0.8 cc/g.

In still another embodiment the present invention provides that that Group IIIA element is Boron the range of about 1 to 10 wt %.

In an embodiment boron is impregnated on support preferably using boric acid.

In a further embodiment the present invention provides that Group VA element is Phosphorus in a range about 1 to 10 wt % wt %.

In an embodiment phosphorus is impregnated on support preferably using orthophosphoric acid.

In another embodiment the present invention provides that Group VIB element is Molybdenum in the range of about 10 to 15 wt %, or Tungsten in the range of about 10 to 19 wt %. In an embodiment the molybdenum and tungsten are impregnated on support preferably using ammonium hepta molybdate salt and Tungsten ammonium meta tungstate, respectively.

In yet another embodiment the present invention provides that Group VIIIB elements are selected from the group comprising Cobalt, Nickel, Ruthenium, Palladium, Platinum, Iridium or combinations thereof wherein Cobalt or Nickel is in the range of about 1 to 6 wt %.

In still another embodiment the present invention provides that the catalyst composition comprises Ruthenium in the range of about 0.01 to 10 wt %. It is a preferred embodiment that ruthenium is impregnated on support using ruthenium chloride.

In a further embodiment the present invention provides a process for preparing a catalyst composition for conversion of vegetable oils to hydrocarbon products in the diesel boiling range as claimed in any of the preceding claims comprising the steps of: (i) drying the porous support; (ii) depositing Group III A or VA elements and drying; (iii) impregnating Group VIB elements and drying; (iv) impregnating Group VIIIB elements; (v) drying; and (vi) calcining.

In another embodiment the present invention provides that the drying in step (i) is carried out at about 350° C. to 500° C. for about four hours; depositing Group III A or VA elements of step (ii) is done by equilibrium adsorption or wet impregnation method; the drying in step (ii) is done at room temperature for about one hour; impregnating Group VIB elements in step (iii) is done by equilibrium adsorption or wet impregnation method; drying in step (iii) is done for about ten to fourteen hours at about 100° C. to 120° C.; impregnating Group VIIIB elements in step (iv) is done by equilibrium adsorption or wet impregnation method either at room temperature or at temperatures slightly above room temperatures; drying in step (v) is done at about 90° C. to 110° C. for about ten to fourteen hours; and calcining of step (vi) is at about 400° C. to 540° C. for about four hours.

In yet another embodiment the present invention provides a process for conversion of vegetable oils to hydrocarbon products in the diesel boiling range using the catalyst composition disclosed herein.

In still another embodiment the present invention relates to the Hydrocarbon products in the diesel boiling range obtained using the catalyst composition disclosed herein.

In a further embodiment the present invention provides a process for conversion of vegetable oils to hydrocarbon products in the diesel boiling range using catalyst composition disclosed herein or discarded refinery spent hydro-treating catalyst comprising the steps of: (i) introducing oil in a reactor; (ii) heating the reactor; (iii) hydro-treating by adding pre-sulfided catalyst composition or discarded refinery spent hydro-treating catalyst; and (iv) collecting hydro-treated samples.

In another embodiment the present invention provides that reactor is a high pressure batch reactor or trickle bed SS reactor; the oil is introduced using high pressure liquid dosing pump and the oil is preferably Jatropha oil; the heating of reactor is performed using a furnace preferably an electric furnace; pre-sulfided catalyst is obtained by treating said catalyst with Sulfurzol over a period of about 2 to 8 hours at about 300° C. to 350° C. and about 40 bar hydrogen pressure; discarded refinery spent hydro-treating catalyst is calcined to remove coke in presence of either oxygen or air preferably 1% oxygen.

In yet another embodiment the present invention provides that the discarded refinery spent hydro-treating catalyst has surface area of in the range of about 170 to 200 m²/g, pore volume of about 0.4 to 0.6 cc/g and ABD of about 0.84 g/cc. In still another embodiment the present invention provides Hydrocarbon products in the diesel boiling range obtained by the process disclosed herein.

DETAILED DESCRIPTION OF INVENTION

Figure 1:
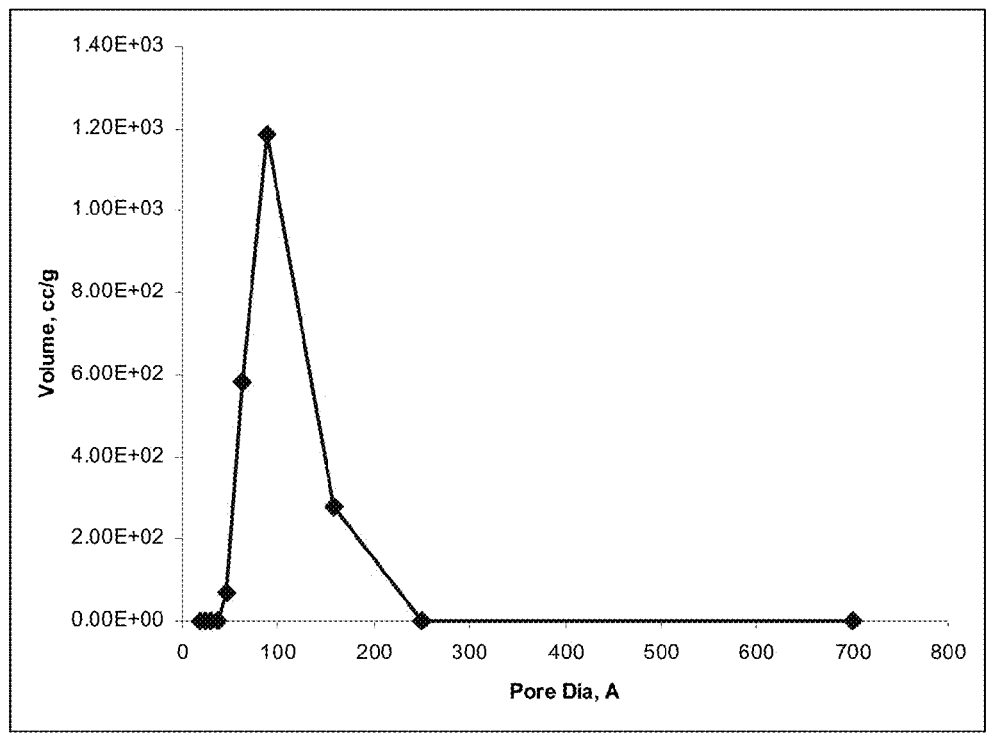
FIG. 1: Pore size distribution of fresh inorganic oxide support

Having summarized the invention, it is now described in detail below by reference to the following description and non-limiting examples.

In a typical conventional hydro-treating process diesel is hydro-treated at high temperature and high hydrogen pressure in a trickle bed reactor where reactor is loaded with proprietary catalyst in a graded manner. In the present invention hydro-treating catalyst is a transition metal supported on inorganic material. Catalyst is sulfided prior to hydro-treating to convert the metal oxides to active sulfided form. During the process of sulfidation coordinatively unsaturated sites (CUS) are created and these are active sites responsible for hydro-treating reactions. Generally hydro-treating conditions are temperatures ranging from 320 to 370° C. and hydrogen pressures ranging from 35 to 50 bar and LHSV ranging from 1 to 1.5 $H^{-1}$.

In vegetable oil hydro-treating process the metal function of the catalyst and a high hydrogen pressure contribute to the saturation of the side chains of the triglycerides. The acid function of the catalyst contributes to the cracking of the C—O bond and to the isomerization of the n-olefins formed, which are then transformed in isoparaffins (Rogelio Sotelo-Boyása, Yanyong Liub, and Tomoaki Minowab, production of green diesel by hydrocracking of Canola oil on NiMo/Al2O3 and pt-Zeolitic based catalysts. Advanced Industrial Science and Technology, published by American Institute Of Chemical Engineers, Annual Meeting held in Philadelphia Pa. during Nov. 16-21, 2008. Optimum high temperature is important to increase the cracking activity. However, at temperatures higher than 380° C. cracking of the hydrocarbons increases and hence the yield of diesel decreases. Though more gasoline and propane can be obtained in this manner, and depending on the refiner requirements, there may also be desirable products.

The hydrocarbon mixture produced from the hydro-treating or hydro-cracking of vegetable oils is commonly called "green diesel", since it is "diesel" produced from "green plants". "Green diesel" is mainly composed of n-heptadecane and n-octadecane. As both of them contain a high octane number, "green diesel" can also be used as a cetane additive. A "green diesel" with high content of isoparaffins is desirable as they have lower pour point than those of the corresponding n-paraffins. The quantum of isoparaffins from vegetable oil hydro-conversion activity depends on the acidity of the catalyst. Thus, one needs to select suitable operating conditions and catalysts to obtain maximum yield of high quality "green diesel".

Hydro-Conversion of Vegetable Oils Chemistry

Many authors tried to elucidate the mechanism of hydro-conversion of vegetable oils to diesel. It is generally believed that triglycerides are first saturated on their side chain, followed by scission of the C—O bond, leading to the formation of diglycerides, monoglycerides, carboxylic acids and waxes. Then, these are transformed into hydrocarbons by three different paths, i.e. hydro-deoxygenation, decarbonylation and decarboxylation (Rogelio Sotelo-Boyása, Yanyong Liub, and Tomoaki Minowab, production of green diesel by hydrocracking of Canola oil on NiMo/Al2O3 and pt-Zeolitic based catalysts. Advanced Industrial Science and Technology, published by American Institute Of Chemical Engineers, Annual Meeting held in Philadelphia Pa. during Nov. 16-21, 2008.

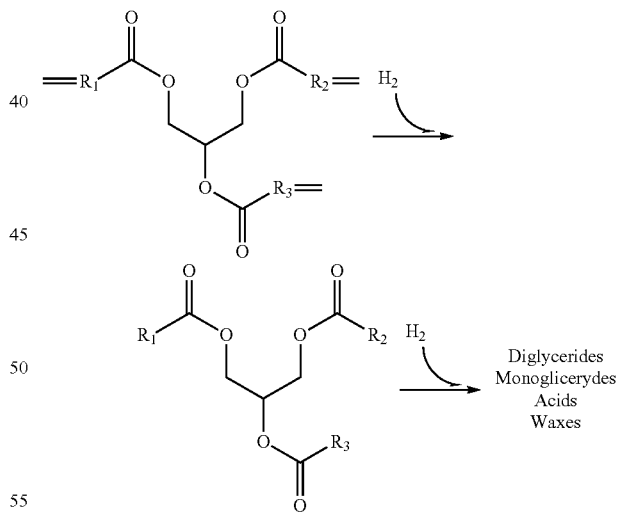

a. Decarboxylation:

$$C_{17}H_{35}COOH \rightarrow C_{17}H_{36} + CO_2$$

b. Decarbonylation:

$$C_{17}H_{35}COOH + H_2 \rightarrow C_{17}H_{36} + H_2O + CO \quad \text{(Catalytic reaction)}$$

$$C_{17}H_{35}COOH \rightarrow C_{15}H_{31}CH = CH_2 + H_2O + CO \quad \text{(Thermal reaction)}$$

c. Reduction (hydrodeoxygenation):

$$C_{17}H_{35}COOH + 3H_2 \rightarrow C_{18}H_{38} + 2H_2O$$

The main hydro-conversion products are n-heptadecane and n-octadecane. As by products, carbon monoxide, carbon dioxide, and water are obtained. Due to the acid function of the catalyst, isomerization and cyclization of the olefin intermediates can occur, leading to the production of isoparaffins, naphthenes; and in case there is not enough hydrogenation, aromatics can be formed. Dehydrogenation is favoured at high temperature and low pressure.

The present invention provides new catalyst compositions; their process of preparation; and use of these catalyst compositions for conversion of vegetable oils to hydrocarbon products in the diesel boiling range. The invention is illustrated and supported by the following Examples. These are merely representative Examples and are not intended to restrict the scope of the present invention in any way.

The following examples demonstrate the procedure for making the better catalyst as described in the present invention. These examples also compare various catalyst compositions made to arrive at a better formulation.

EXAMPLE-1

Vegetable oil hydro-conversion catalysts are prepared using a commercially available porous, high surface area γ-alumina extrudates with an average diameter in the range of about 1 to 1.5 mm and length in the range of about 4-7 mm. The support material contains unimodal pore size distribution having majority of the pores in the range of about 20-250 A°. The above support material was dried at about 500° C. in air for about 4 Hrs. Dried support is deposited with desired amount of Phosphorous (P) or Boran (B) using orthophosphoric acid or boric acid and dried at room temperature for about one hour. Subsequently molybdenum (Mo) is impregnated by using ammonium hepta molybdate salt and dried for about 10-14 hours. Cobalt (Co) or Nickel (Ni) is impregnated on Mo and P or B impregnated support. The final product is dried at about 110° C. for about 10-14 hours and calcined at about 540° C. for four hours. These samples are referred as catalysts-1, 2 respectively (Table-1).

Hydro-conversion of vegetable oils to diesel activity studies are carried out using trickle bed SS reactor. Untreated Jatropha oil is taken as feed in all reactions. Feed is introduced by using high pressure liquid dosing pump. The reactor is heated using an electric furnace attached with temperature controller/programmer. Catalyst is sulfided prior to reaction using Sulfurzol over a period of about 4-8 hours at about 350° C. and about 40 kg hydrogen pressure. Then jatropha oil is passed through catalyst. Initial 24 hours sample product is rejected and subsequently hydro-treated samples are collected for analysis. In all the cases the material balance was more than 95%. Diesel yield in product is calculated by using Sim Dist GC.

The above described catalyst had the following characteristics and activity as given in Table-1.

TABLE 1

| | Mo, wt % | Co, wt % | Ni wt % | $P_2O_5$, wt % | $B_2O_5$, wt % |
|---|---|---|---|---|---|
| Catalyst 1 | 14 | Nil | 3 | 1 | nil |
| Catalyst 2 | 14 | 3 | nil | nil | 1 |

| | Product properties | | |
|---|---|---|---|
| | Density, g/cc | Viscosity, Cps | Diesel yield, % |
| Feed | 0.910 | 87 | 5 |
| Catalyst 1 | 0.798 | 6.2 | 85 |
| Catalyst 2 | 0.813 | 9.7 | 80 |

Diesel yield = Product fraction boiling below 410° C.

EXAMPLE-2

Another set of catalysts are prepared using a commercially available porous, high surface area γ-alumina extrudates with an average diameter in the range of about 1 to 1.5 mm and length in the range of about 4-7 mm. The support material contains unimodal pore size distribution having majority of the pores in the range of 20-250° A (Pore volume=about 0.5-0.8 cc/g and surface area=about 200-250 m²/g). The support is dried at 500° C. in air for about 4 Hrs, before incorporating metals. Alumina support is incorporated with P or B prior to metals impregnation using orthophosphoric acid or boric acid. Modified alumina is impregnated with Tungsten (W) using ammonium meta tungstate supplied by sigma Aldrich, 99% purity chemical. Co or Ni is impregnated on Tungsten impregnated support. The final product is dried at about 110° C. for over-night and calcined at about 540° C. for four hours. These samples are referred as catalysts-3, 4 respectively.

TABLE 2

| | W, wt % | Co, wt % | Ni wt % | $P_2O_5$, wt % | $B_2O_5$, wt % |
|---|---|---|---|---|---|
| Catalyst 3 | 18 | nil | 3 | 1 | nil |
| Catalyst 4 | 18 | 3 | nil | nil | 1 |

| | Product properties | | |
|---|---|---|---|
| | Density, g/cc | Viscosity, cps | Diesel yield, % |
| Catalyst 3 | 0.85 | 15 | 40 |
| Catalyst 4 | 0.86 | 18 | 40 |
| Feed | 0.91 | 87 | 5 |

Diesel yield = Product fraction boiling below 410° C.

EXAMPLE-3

Ruthenium based catalysts are prepared using commercial alumina support as described in Example 1. The support was dried at about 500° C. in air for about 4 Hrs, before incorporating metals. Different concentrations (1 to 10 wt %) of Ruthenium (Ru) metal are impregnated on support using Ruthenium chloride salt by incipient wetness method. The final catalysts are dried at about 110° C. for about 10-14 hours and calcined at about 540° C. for four hours. These samples are referred as catalysts-5, 6 respectively.

Hydro-conversion studies are carried out in a high pressure batch reactor. In a typical experiment a known weight of catalyst (0.25-0.50 g) is suspended in Jatropha oil (about 60 ml). Prior to loading catalyst is reduced in presence of hydrogen at about 300° C. for about 2 Hrs in a separate reactor. The reactor is flushed with $H_2$ till the unit is free from air. The reactor is pressurized to about 40 bar pressure with hydrogen and at temperature of about 350° C. Catalyst is separated by filtration. Diesel yield is estimated by using Sim Dist GC.

TABLE 3

| | Ru, wt % |
|---|---|
| Catalyst 5 | 5 |
| Catalyst 6 | 10 |

| | Product properties | | |
|---|---|---|---|
| | Density, g/cc | Viscosity, Cps | Diesel yield, % |
| Catalyst 5 | 0.801 | 9 | 50 |
| Catalyst 6 | 0.82 | 15 | 40 |
| Feed | 0.91 | 87 | 5 |

Diesel yield = Product fraction boiling below 410° C.

EXAMPLE-4

Figure 2:
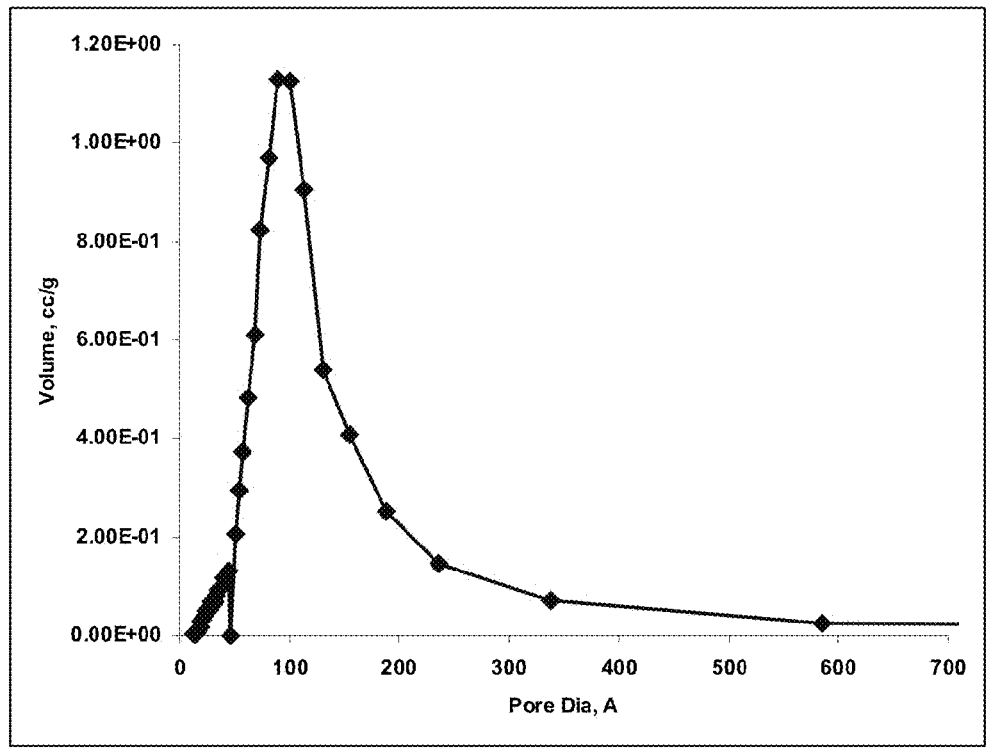
FIG. 2: Pore size distribution of typical spent refinery hydrotreating catalyst.

In this Example refinery spent hydrotreating catalyst is used for hydro conversion of vegetable oil. The discarded refinery spent hydrotreating catalyst is treated for removing coke by calcining in presence of either oxygen or air preferably 1% Oxygen. After treatment the catalyst has surface area of about 170 to 200 m$^2$/g, pore volume of about 0.4 to 0.6 cc/g and ABD of about 0.84 g/cc preferably about 190 m$^2$/g, pore volume of about 0.6 cc/g and ABD of about 0.84 g/cc. The pore size distribution pattern is shown in the FIG. 2. The treated catalyst is sulfided in a reactor prior to testing in high pressure batch reactor. Testing procedure is in batch reactor is same as provided in Example 3 and catalyst is referred as Catalyst 7.

TABLE 4

|  | Mo, wt % | Co/Ni, wt % |
|---|---|---|
| Catalyst 7 | 15 | 4 |

| | Product properties | | |
|---|---|---|---|
| | Density, g/cc | Viscosity, Cps | Diesel yield, % |
| Catalyst 7 | 0.801 | 10 | 45 |
| Feed | 0.91 | 87 | 5 |

Diesel yield = Product fraction boiling below 410° C.

EXAMPLE-5

Various noble metals [Pd Palladium), Pt (Platinum), Ir (Iridium)] supported on commercial alumina catalysts are tested for hydro-conversion of vegetable oils to diesel. These samples are referred as catalysts-8, 9, 10 respectively. Hydro-conversion studies are carried out in high pressure batch reactor. In a typical Experiment a known weight of catalyst (0.25-0.50 g) is suspended in Jatropha oil (60 ml). Prior to loading, catalyst is reduced in presence of hydrogen at about 300° C. for about 2 Hrs. The reactor is flushed with H$_2$ till the unit is free from air. The reactor is pressurized to about 40 bar pressure with hydrogen. After pressure leakage test, reactor is heated to desired reaction temperature of about 350° C. After the reaction the vessel is cooled and de-pressurized. Product is separated by filtration. Percentage distillation is measured by injecting the sample in to simulated distillation GC to find out the diesel yield.

| | Metal | Wt % |
|---|---|---|
| Catalyst 8 | Pd | 3.0 |
| Catalyst 9 | Ir | 0.9 |
| Catalyst 10 | Pt | 0.5 |

| | Product properties | | |
|---|---|---|---|
| | Density | Viscosity | Diesel yield, % |
| Catalyst 8 | 0.841 | 8.6 | 45 |
| Catalyst 9 | 0.85 | 20 | 35 |
| Catalyst 10 | 0.83 | 22 | 40 |
| Feed | 0.91 | 87 | 5 |

Diesel yield = Product fraction boiling below 410° C.

The Main Advantages of the Present Invention are:
1. The present invention provides conversion of vegetable oils to diesel at high temperatures and high hydrogen pressures.
2. The catalyst compositions of the present invention are efficient in almost complete conversion of vegetable oils.
3. The catalyst compositions of the present invention retain catalytic activity for longer durations.
4. The diesel obtained using the catalyst compositions of the present invention can be used as transportation fuel.
5. The diesel obtained using the catalyst compositions of the present invention has high cetane number, better fuel properties in the range of diesel and can be easily blended with diesel pool in various proportions.

We claim:

1. A catalyst composition for conversion of vegetable oils to hydrocarbon products in the diesel boiling range comprising:
   (i) a porous support 85-95 wt %;
   (ii) boron or phosphorus elements in the range of about 1 to 10 wt %;
   (iii) molybdenum or tungsten elements in the range of about 1 to 20 wt %; and
   (iv) Group VIII B elements in range of about 0.01 to 10 wt %;
   where the catalyst composition is sulfided prior to hydrotreating; and
   wherein said porous support has unimodal pore size distribution in the range of 20 to 250 Å;
   surface area in the range of 200-250 m$^2$/g; bulk density in the range of 0.80 to 0.85 g/cc; and pore volume in the range of 0.5 to 0.8 cc/g.

2. The catalyst composition as claimed in claim 1, wherein said porous support comprises at least 25% of aluminium oxide.

3. The catalyst composition as claimed in claim 1, wherein boron or phosphorus is in the range of 1 to 5 wt %.

4. The catalyst composition as claimed in claim 1, wherein said Group VIIIB elements are selected from the group comprising Cobalt, Nickel, Ruthenium, Palladium, Platinum, Iridium or combinations thereof.

5. The catalyst composition as claimed in claim 4 wherein said Cobalt or Nickel is in the range of about 1 to 6 wt %.

6. The catalyst as claimed in claim 5, wherein Cobalt or Nickel is in the range of 3 to 5 wt %.

7. The catalyst as claimed in claim 6, wherein the Cobalt or Nickel is in the range of 2 to 4 wt %.

8. The catalyst composition as claimed in claim 4 wherein Ruthenium is in the range of 0.01 to 10 wt %.

9. A process for preparing a catalyst composition for conversion of vegetable oils to hydrocarbon products in the diesel boiling range as claimed in claim 1, comprising the steps of:
   (i) drying the porous support in the range of 350° C. to 550° C. for four hours;
   (ii) depositing Group III A or VA elements by equilibrium absorption or wet impregnation method and drying at room temperature for one hour;
   (iii) impregnating Group VIB elements by equilibrium absorption or wet impregnation method and drying for ten to fourteen hours in the range of 100° C. to 120° C.;
   (iv) impregnating Group VIIIB elements by equilibrium absorption or wet impregnation method either at room temperature or at temperatures slightly above room temperatures;
   (v) drying in the range of 90° C. to 110° C. for ten to fourteen hours; and
   (vi) calcining in the range of about 400° C. to 540° C. for four hours.

10. The process of claim 9 wherein, after calcining, the catalyst is sulfided.

11. The catalyst composition as claimed in claim 1, wherein the group IIIA or Group VA elements are in the range of 1 to 5 wt %.

12. The catalyst composition as claimed in claim 1 wherein Molybdenum is in the range of 10 to 15 wt %.

13. The composition as claimed in claim 1, wherein molybdenum is in the range of 12 to 14 wt %.

14. The composition as claimed in claim 1, wherein Tungsten is in range of 10 to 19 wt %.

15. The composition as claimed in claim 1, wherein Tungsten is in range of 15 to 19 wt.%.

* * * * *

UNITED STATES PATENT AND TRADEMARK OFFICE
CERTIFICATE OF CORRECTION

PATENT NO. : 9,034,782 B2  
APPLICATION NO. : 13/665407  
DATED : May 19, 2015  
INVENTOR(S) : Chiranjeevi Thota et al.

Page 1 of 1

It is certified that error appears in the above-identified patent and that said Letters Patent is hereby corrected as shown below:

Title page, Item (30) Foreign Application Priority Data: Please insert
--INDIA 3055/MUM/2011 10/31/2011--.

Signed and Sealed this
Twenty-ninth Day of September, 2015

Michelle K. Lee
*Director of the United States Patent and Trademark Office*